United States Patent Office 3,582,299
Patented June 1, 1971

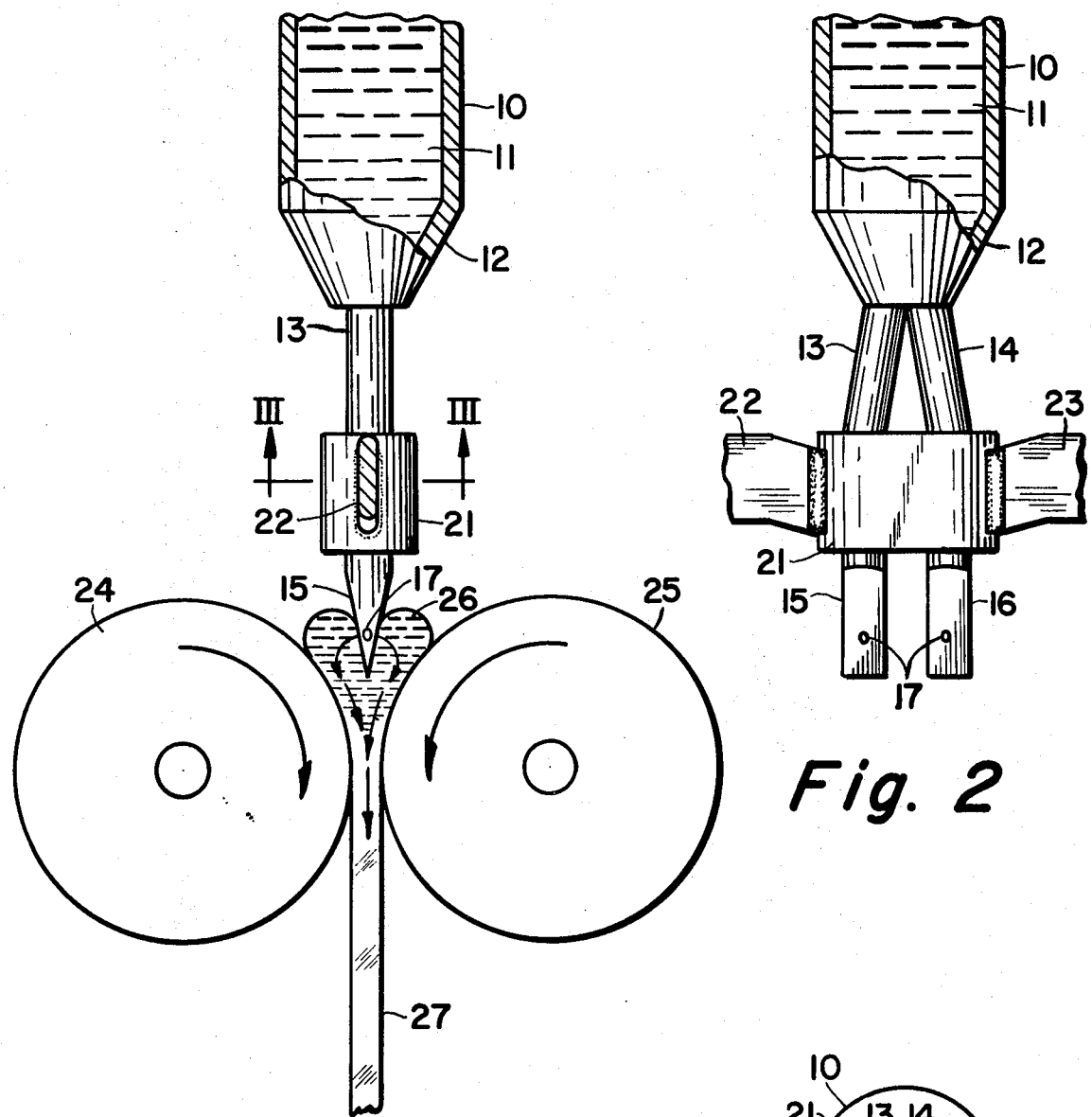
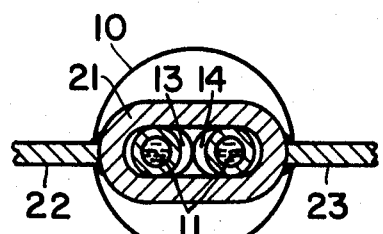

3,582,299
MULTIPLE DELIVERY TIP FOR LIQUID GLASS
Robert T. Gladwell, Jr., 737 Cayuga Drive, R.D. 1,
Horseheads, N.Y. 14845
Filed Nov. 6, 1967, Ser. No. 680,753
Int. Cl. C03b 5/26, 25/00
U.S. Cl. 65—12                                    2 Claims

ABSTRACT OF THE DISCLOSURE

A multiple delivery tip glass feeder for use in an apparatus for forming low viscosity, high surface tension, readily devitrifiable molten glass into ribbon. The multiple delivery tubes are provided with heating means since the tips thereof must be positioned extremely close to the bite of the cooled forming rollers.

BACKGROUND OF THE INVENTION

This invention relates to the formation of thin vitreous glass ceramic ribbon in greater width than was heretofore attainable.

By glass ceramic is meant a material that is melted and formed as a glass and then converted to a substantially crystalline state by a process of controlled devitrification. Vitreous glass ceramic refers to glass ceramic in its glassy state before crystallization, while crystalline glass ceramic refers to glass ceramic in its devitrified state. Readily devitrifiable materials are those materials which readily, and often quickly, crystallize during thermal processing. Such materials are described by Andrew Herczog and S. Donald Stookey in U.S. Patent No. 3,195,030 granted July 13, 1965 and assigned to the assignee of the present invention. Representative compositions are shown in the above-identified patent, and include barium titanate glasses, lead-barium-strontium niobate glasses and the like. Such compositions may be broadly described as members of the family of oxygen-octahedra ferroelectric compounds containing at least one glass forming oxide.

Under ordinary circumstances it is desirable that vitreous glass ceramics be converted to the crystalline state, and good use is made of this phenomenon. However, there are certain circumstances in which it is desirable to maintain a glass ceramic in a vitreous state, even after melting, forming and cooling. One such instance is the particularly difficult formation of substantially continuous thin, vitreous glass ceramic ribbon. Such ribbon may be used as the dielectric material in stacked electrical capacitors, as image orthicon targets, and the like.

It has been customary in the past to roll form glass sheet or ribbon from materials such as ordinary soda-lime window glass by means of the ring-roll process, the upward vertical rolling process, or the continuous horizontal process. In these processes the viscosity of molten glass fed to the rollers is normally several thousand poises, and the ribbon or sheet so formed is usually between about one-eighth and one inch in thickness. The above enumerated methods are completely inadequate and unsatisfactory for producing ribbon having a thickness between about one mil and ten mils, particularly from materials having a viscosity below ten poises and having a high surface tension.

When roll forming low viscosity glass-like materials, such as the readily devitrifiable or thermally crystallizable low viscosity barium titanate glasses or lead-barium-niobate glasses, problems are encountered which are peculiar to such glasses. Due to the relatively high surface tension of such glasses in their molten state, they have a tendency to break up and form a plurality of droplets when in free fall, and it is therefore extremely difficult to deliver a continuous molten stream to the bite of the forming rollers at the relatively low flow rate which must be utilized. Furthermore, due to the readily devitrifiable nature of such glasses, the amount and duration of glass contact with the surface of the rollers before entering the bite must be maintained at a minimum, and the temperature of the vitreous glass ceramic material being delivered to the rollers must be accurately controlled.

Due to the physical properties of the above mentioned glass ceramic materials, they must be heated to about 1500° C. in a suitable furnace or crucible, and the temperature should be maintained at about this level while the material is being delivered to the forming apparatus. In copending application Ser. No. 592,833 for "Heated Delivery Tip for Liquid Glass," filed on Nov. 8, 1966, now U.S. Pat. No. 3,531,268 and assigned to the assignee of the present invention, a delivery tip is described which is heated by resistance heating means to maintain the temperature of the liquid glass emanating therefrom at a suitably high level while the glass is being delivered to the ribbon forming rollers. Good quality ribbon can be made in relatively narrow widths by utilizing the apparatus described in the above described copending application. However, attempts at increasing the width of the ribbon formed by this apparatus resulted in ribbon of unsatisfactory quality due to improper cooling of the glass as the amount of glass delivered to the rollers was increased.

An apparatus for feeding a plurality of individual streams of molten readily devitrifiable glass to a pair of rollers is described in U.S. Patent No. 3,271,125 granted to George D. Lipp on Sept. 6, 1966 and assigned to the assignee of the present invention. The apparatus described by this patent consists of a plurality of orifices or lips from which spaced molten glass streams issue and thereafter fall through a heated, restricted passageway to the bite of a pair of cooperating forming rollers which are located below the passageway. A pool of the desired length is thus formed across the bite of the rollers. The delivery system of this patent is stated to be useful for glasses having a viscosity between 10 and 300 poises. This apparatus is unacceptable for forming ribbon from glass having a high surface tension and a viscosity under 10 poises such as that described in the above mentioned U.S. Patent No. 3,195,030. Glass having a viscosity below 10 poises has a surface tension which would tend to break up the stream and form droplets, resulting in the production of unsatisfactory sheet or ribbon.

SUMMARY OF THE INVENTION

It is therefore an object of this invention to provide an apparatus for forming a wide ribbon from a stream of molten, readily devitrifiable glass having low viscosity and high surface tension.

A further object of this invention is to provide an apparatus for delivering a plurality of separate, closely-spaced streams of molten glass to a pair of forming rollers.

An additional object of this invention is to provide an apparatus for delivering a plurality of continuous streams of low viscosity, high surface tension, readily devitrifiable glass to the bite of a pair of forming rollers so as to produce a ribbon of increased width.

Briefly, this invention relates to an apparatus for feeding a plurality of spaced pools of molten glass to the bite of a pair of forming rollers to form a single, monolithic ribbon. The molten glass which is to be utilized in this apparatus is particularly difficult to handle in that it is readily devitrifiable and has a high surface tension and an extremely low viscosity. This apparatus comprises a source of molten glass to which at least two delivery tubes are connected. The remaining ends of the delivery tubes terminate adjacent the bite of the ribbon forming rollers and each of the delivery tubes supplies a pool of molten glass to the rollers. The spacing between the delivery tubes is such that the pools formed by the molten glass emanating therefrom join at the bite of the rollers to form a single monolithic ribbon.

Additional objects, features, and advantages of the present invention will become apparent to those skilled in the art from the following detailed description and the attached drawing, on which, by way of example, only the preferred embodiment of this invention is illustrated.

BRIEF DESCRIPTION OF THE DRAWINGS

FIG. 1 is a side elevation view, partially in section, of a preferred embodiment of this invention;

FIG. 2 is a front view of the preferred embodiment; and

FIG. 3 is a cross sectional view taken along lines III—III of FIG. 1.

DETAILED DESCRIPTION

Referring now to the drawings, there is shown a main delivery tube 10 which is adapted to be connected to a furnace or crucible (not shown) which provides the delivery tube 10 with a source of molten glass ceramic material 11. The end of the delivery tube 10 is connected by a transition section 12 to a pair of secondary delivery tubes 13 and 14, the ends of which terminate in knife-edge delivery tips 15 and 16 respectively. In this embodiment there are four holes 17 in each of the delivery tips, one being in each of the four sides thereof. Surrounding the secondary delivery tubes 13 and 14 is a hollow cylindrical resistance heater 21 to which is welded or otherwise attached a pair of current conducting leads 22 and 23. The tubes 13 and 14 are frictionally secured within the cylindrical heater 21 to permit the adjustment of the distance between the tips 15 and 16 by forcefully adjusting the position of the tubes within the heater. If desired, the single cylinder 21 could be replaced by a pair of cylinders, one of which would surround each of the tubes 13 and 14; however, the single cylinder 21 is preferred since it permits the easy adjustment of the tip spacing. The bite of a pair of cooperating rollers 24 and 25 is located adjacent the knife-edge portion of the delivery tips. Liquid glass ceramic material which emanates from the holes 17 forms a pool 26 at the bite of the rollers 24 and 25 adjacent each of the knife-edge portions of the secondary delivery tubes 13 and 14. The rollers are continuously rotated by any well-known variable drive means, in the direction of the arrows shown in FIG. 1, to withdraw molten material at a desired rate from the pools 26 to continuously form a ribbon 27. If the tips 15 and 16 are spaced too far apart, two ribbons will be simultaneously formed. However, if the distance between the tips is adjusted so that the pools formed at the two tips flow together at the pinch point or bite of the rollers, a single ribbon is formed. Moreover, if the tips are too close together, a single pool of glass will be formed above the bite of the rollers, resulting in the formation of ribbon of unsatisfactory quality.

The following specific embodiment of this invention, which is not intended to be limiting in nature, is set forth solely as an illustrative example so that those skilled in the art may more readily understand and practice the invention. A crucible (not shown), to which the delivery tube 10 is connected, is filled with approximately two pounds of batch material which causes the temperature of the crucible to drop for a period of time. Heat is applied to the crucible in any well known manner to raise the temperature thereof to about 1500° C. The batch is mixed for approximately fifteen minutes. After the crucible reaches the proper temperature, the current through the electrodes 22 and 23 is increased to about 600 or 700 amps. and an oxygen-hydrogen flame is simultaneously applied to the tips. The heat from this flame in addition to that due to the high current flowing through the resistance heater causes the glass to flow from the holes 17 in the tips 15 and 16. When the flow begins, the crucible is evacuated to restrict the flow and make it controllable. Apparatus for controlling the flow by regulating the pressure in the crucible is described in U.S. Pat. Nos. 3,186,817 and 3,266,881 granted to T. Novack and T. Novack et al. respectively, which are assigned to the assignee of the present invention. After the flow begins the flame is removed and the current through the resistance heating cylinder 21 is reduced to a value which maintains the proper temperature at the tips.

The spacing between the tips 15 and 16, which has been previously adjusted by forcing the tubes 13 and 14 to a desired location within the cylindrical heater 21, permits the formation of two pools of molten glass which flow together at the pinch point of the rollers to form a single ribbon. In this specific embodiment the centerlines of the tips 15 and 16 are located 5/16 inch apart. The length of the secondary delivery tubes from the transition section 12 to the knife-edge tips 15 and 16 is 1½ inches.

The rollers are water cooled by any well known means such as that disclosed in the Danner patent, No. 2,225,369. As hot streaks or stoppages of the flow due to the cooling occur, the tip current is adjusted accordingly.

The delivery tubes, the electrodes and the resistance heating cylinder may be made from platinum, a platinum-rhodium alloy or some other suitable high temperature material. A preferred material is an alloy consisting of 80% platinum and 20% rhodium.

The glass ceramic material easily wets a tip made of this material and may even flow upward from the holes 17. The entire tip of each delivery tube becomes wet with the molten glass which would then fall therefrom in droplets except for the fact that the knife-edge tips are situated so close to the bite of the rollers that a uniform flow is delivered to the rollers. The tips should be located as close to the rollers as is possible without actually contacting the rollers. Care must be taken to insure that the two tips are adequately separated from each other and that the secondary tubes 13 and 14 extend a suitable distance from the heater 21 so that the molten glass emanating therefrom does not flow up the tubes 13 and 14 to form a single mass which would give the effect of a single delivery tube. The apparatus described herein prevents the glass from excessively cooling during delivery until it contacts the rollers, thus preventing devitrification of the glass.

Various modifications can be made to the preferred embodiment without departing from the scope of this invention. For example, three or more secondary delivery tubes could be utilized to form a ribbon which is wider than that which can be formed with two delivery tubes. Furthermore, the tips can be heated by means other than the described resistance heater. Also, the secondary delivery tubes 13 and 14 could have a square cross-sectional shape to provide greater thermal contact area with the cylinder 21.

I claim:

1. In the manufacture of glass ribbon from molten readily devitrifiable glass having a high surface tension and a viscosity under ten poises, apparatus for feeding a plurality of spaced pools of molten glass to the bite of a pair of forming rollers so as to form from said pools a single, monolithic ribbon, said apparatus comprising a source of molten glass;

a pair of cooperating ribbon forming rollers;

at least two spaced flexible delivery tubes each having a first end connected to said source of molten glass and a second end located adjacent the bite of said rollers; and means for heating said delivery tubes and adjusting the distance therebetween comprising a hollow cylindrical resistance heater surrounding said plurality of delivery tubes, said heater having two parallel internal walls which frictionally contact said delivery tubes being slidable within said heater so that the spacing between the second ends of said tubes is adjustable, the distance which said delivery tubes extend from said heater being sufficiently long to prevent the molten glass which emanates therefrom from running together and forming a single mass of glass above the bite of said rollers.

2. Apparatus as defined in claim 1 wherein the second ends of said delivery tubes terminate in knife edges which run parallel to the bite of said rollers, and which are located as close as possible to said rollers without contacting the same.

References Cited

UNITED STATES PATENTS

| | | | |
|---|---|---|---|
| Re. 21,863 | 7/1941 | Slayter | 65—12 |
| 1,622,666 | 3/1927 | Peiler | 65—327 |
| 3,078,695 | 2/1963 | Kozak | 65—128 |
| 3,271,125 | 9/1966 | Lipp | 65—145 |
| 3,531,268 | 9/1970 | Allen | 65—374X |

FRANK W. MIGA, Primary Examiner

U.S. Cl. X.R.

65—324, 326, 333, 374, 328